US011504908B2

(12) United States Patent
Makino et al.

(10) Patent No.: US 11,504,908 B2
(45) Date of Patent: Nov. 22, 2022

(54) ADDITIVE MANUFACTURING SYSTEM AND CONTAINER

(71) Applicant: SINTOKOGIO, LTD., Nagoya (JP)

(72) Inventors: Hiroyasu Makino, Toyokawa (JP); Yoshihisa Suzuki, Toyokawa (JP); Hideki Morimitsu, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 395 days.

(21) Appl. No.: 16/808,602

(22) Filed: Mar. 4, 2020

(65) Prior Publication Data

US 2020/0282647 A1   Sep. 10, 2020

(30) Foreign Application Priority Data

Mar. 6, 2019   (JP) .............................. JP2019-040339

(51) Int. Cl.
  *B29C 64/255*   (2017.01)
  *B33Y 30/00*   (2015.01)
  *B29C 64/291*   (2017.01)

(52) U.S. Cl.
  CPC .......... *B29C 64/255* (2017.08); *B29C 64/291* (2017.08); *B33Y 30/00* (2014.12)

(58) Field of Classification Search
  None
  See application file for complete search history.

(56) References Cited

U.S. PATENT DOCUMENTS

| 4,877,932 A | * | 10/1989 | Bernstein | ........... B65D 81/3453 426/243 |
| 8,741,194 B1 | | 6/2014 | Ederer et al. | |
| 2009/0223951 A1 | * | 9/2009 | Lai | ....... H05B 6/6408 219/729 |
| 2014/0348989 A1 | * | 11/2014 | Sloat | ........ A23L 5/13 219/731 |
| 2015/0367572 A1 | | 12/2015 | De Pena Hempel et al. | |
| 2017/0129183 A1 | * | 5/2017 | Dufort | .................. B33Y 30/00 |

FOREIGN PATENT DOCUMENTS

| CN | 104493101 A | 4/2015 | |
| CN | 108367341 A | 8/2018 | |
| CN | 109311079 A | 2/2019 | |
| DE | 102009056696 A1 * | 6/2011 | ............ B22F 3/1055 |
| JP | S48-006924 A | 1/1973 | |
| JP | S49-032817 A | 3/1974 | |
| JP | S57-102443 U | 6/1982 | |

(Continued)

*Primary Examiner* — Yung-Sheng M Tsui

(74) *Attorney, Agent, or Firm* — Faegre Drinker Biddle & Reath LLP

(57) ABSTRACT

The additive manufacturing system includes a container having an upper part being opened, a base part being vertically movable, and defining a space therein, the space being fillable with sand as a base material of a molded object, an additive manufacturing apparatus forming a green body of the molded object layer by layer in the container while causing the base part to move down, and a microwave oven defining a space therein, the space configured to house the container including the green body, the microwave oven configured to irradiate the container with a microwave to obtain the molded object, wherein a part or a whole of the container is made of a dielectric.

11 Claims, 5 Drawing Sheets

(56) References Cited

FOREIGN PATENT DOCUMENTS

| | | |
|---|---|---|
| JP | H08-252866 A | 10/1996 |
| JP | H09-94883 A | 4/1997 |
| JP | 2004-188447 A | 7/2004 |
| JP | 4785333 B2 | 10/2011 |
| JP | 2017-527453 A | 9/2017 |
| JP | 2017-538585 A | 12/2017 |
| WO | WO-2016/030375 A2 | 3/2016 |
| WO | WO-2016030375 A2 * 3/2016 | ............. B22F 10/70 |
| WO | WO-2016/091249 A1 | 6/2016 |
| WO | WO-2016091249 A1 * 6/2016 | ............. B22C 1/188 |

* cited by examiner

ADDITIVE MANUFACTURING SYSTEM AND CONTAINER

CROSS-REFERENCE TO RELATED APPLICATION

This application is based on Japanese Patent Application No. 2019-040339 filed with Japan Patent Office on Mar. 6, 2019, the entire contents of which are hereby incorporated by reference.

TECHNICAL FIELD

The present disclosure relates to an additive manufacturing system and a container.

BACKGROUND

Japanese Patent No. 4785333 describes a part manufacturing method for manufacturing a part by forming a multilayered composite material including the part using a deposition method. This method deposits layers, one by one in a container to form a multilayered composite material. Next, the multilayered composite material is then moved to a place where a solidifying process is executed. All layers of the multilayered composite material in the container are collectively solidified using energy such as heat.

A microwave may be adopted as the energy used for the solidifying process. However, there is a possibility that the microwave may not propagate sufficiently depending on the container. For this reason, there is a possibility that the multilayered composite material in the container cannot be cured efficiently and curing may take time.

The present disclosure provides an additive manufacturing system and a container capable of improving a speed of manufacturing a molded object.

SUMMARY

An additive manufacturing system according to an aspect of the present disclosure includes a container having an upper part being opened, a base part being vertically movable, and defining a space therein, the space being fillable with sand as a base material of a molded object, an additive manufacturing apparatus forming a green body of the molded object layer by layer in the container while causing the base part to move down, and a microwave oven defining a space therein, the space configured to house the container including the green body, the microwave oven configured to irradiate the container with a microwave to obtain the molded object, wherein a part or a whole of the container is made of a dielectric.

In the additive manufacturing system, the container is filled with the sand as a base material of the molded object. The additive manufacturing apparatus forms the green body of the molded object layer by layer in the container while causing the base part to descend. The container including the green body is housed in the microwave oven. The green body is irradiated with a microwave from the microwave oven via the container. The green body is thus heated and cured, and the molded object is thereby obtained in the container. A part or a whole of the container is made of a dielectric, and therefore, the microwave can be transmitted into the container not only from the upper opening but also from the part made of the dielectric. Thus, according to this additive manufacturing system, it is possible to shorten the time to obtain the molded object from the green body compared to a system using a container that transmits a microwave only from the upper opening. Therefore, according to this additive manufacturing system, it is possible to improve a speed of manufacturing the molded object.

In the embodiment, the container may further include a side wall in which an opening is formed and a dielectric member provided in the opening of the side wall and made of a dielectric. In this case, since the dielectric member is provided in the opening of the side wall of the container, part of the container is made of a dielectric. While maintaining a structure that easily transmits a microwave using the dielectric member, the container can improve durability by forming the side wall using a higher-strength material than that of the dielectric.

In the embodiment, the container may further include a support member supporting the dielectric member, the dielectric member being retained between the support member and the side wall, a fixing member fixing the support member to the container, and a resin sheet interposed between the dielectric member and the support member. In this case, since the resin sheet is interposed between the dielectric member and the support member, friction between the dielectric member and the support member generated due to a thermal expansion difference between the dielectric member and the support member is reduced. The additive manufacturing system can thereby prevent deformation or damage of the dielectric member.

In the embodiment, the dielectric may be ceramic. In the embodiment, the additive manufacturing apparatus may form the green body using sand and a binder.

A container according to another aspect of the present disclosure is a container, an upper part of which is opened, a base part of which can ascend/descend and in which a space is defined that can be filled with sand as a base material of a molded object and an additive manufacturing apparatus forms a green body of the molded object, the container being able to be housed in a microwave oven, a part or a whole of the container being made of a dielectric.

In this container, an inside of the container is filled with sand as a base material of the molded object. The additive manufacturing apparatus forms a green body of the molded object layer by layer in the container while causing a base part thereof to descend. The container including the green body is housed in the microwave oven. Since the green body is heated and cured with a microwave radiated from the microwave oven, the molded object is obtained in the container. Since a part or a whole of the container is made of a dielectric, the microwave can be transmitted into the container not only from the upper opening but also from the part made of the dielectric. Thus, according to this container, it is possible to shorten the time to obtain the molded object from the green body compared to a container that allows the microwave to transmit only from the upper opening. Therefore, according to this container, it is possible to improve the speed of manufacturing the molded object.

In the embodiment, the container may further include a side wall in which an opening is formed and a dielectric member provided in the opening of the side wall and made of a dielectric. In this case, since the dielectric member is provided in the opening of the side wall of the container, part of the container is made of a dielectric. While maintaining a structure that easily transmits a microwave using the dielectric member, the container can improve durability by forming the side wall using a higher-strength material than that of a dielectric.

In the embodiment, the container may further include a support member supporting the dielectric member, the dielectric member being retained between the support member and the side wall, a fixing member fixing the support member to the container, and a resin sheet interposed between the dielectric member and the support member. In this case, since the resin sheet is interposed between the dielectric member and the support member, friction between the dielectric member and the support member generated due to a thermal expansion difference between the dielectric member and the support member is reduced. The container can thereby prevent deformation or damage of the dielectric member.

In the embodiment, the dielectric may be ceramic. In the embodiment, the additive manufacturing apparatus may form the green body in the space using the sand and a binder.

The additive manufacturing system and the container according to the present disclosure can improve the speed of manufacturing a molded object.

DETAILED DESCRIPTION

Figure 1:
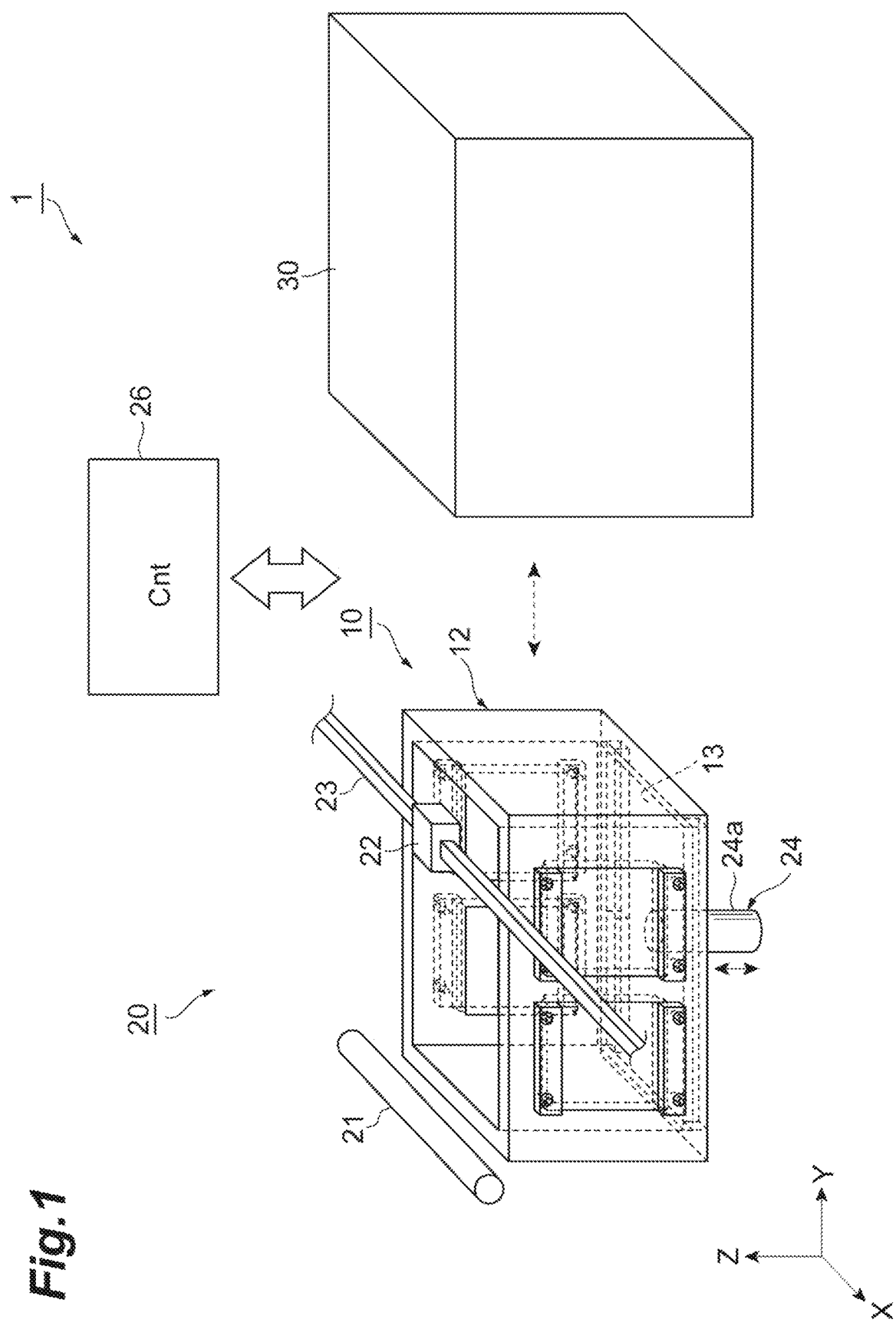
FIG. 1 is a schematic view illustrating an example of an additive manufacturing system according to an embodiment.

Hereinafter, embodiments of the present disclosure will be described with reference to the accompanying drawings. Note that identical or corresponding elements in the following description are assigned the same reference numerals and duplicate description will not be repeated. Dimensional ratios among the drawings do not always coincide with the described ones. Terms "up," "down," "left" and "right" are based on the illustrated states, and are for convenience.

FIG. 1 is a schematic view illustrating an example of an additive manufacturing system according to an embodiment. In the drawing, an X direction and a Y direction are horizontal directions and a Z direction is a vertical direction. An X-axis direction, a Y-axis direction and a Z-axis direction are axial directions that are orthogonal to each other in an orthogonal coordinate system of a three-dimensional space. Hereinafter, the Z direction will also be referred to as an "up-down direction."

An additive manufacturing system 1 shown in FIG. 1 is provided with a container 10, an additive manufacturing apparatus 20 and a microwave oven 30. The additive manufacturing apparatus 20 fills the container 10 with sand to form a green body. The microwave oven 30 houses the container 10 containing the sand and green body, and obtains a molded object by radiating a microwave. The "green body" is an unsintered substance formed using sand. The green body may be any substance before sintering. The green body may be so soft that it cannot keep its posture without any support body or may be cured by heat or pressure or the like. The green body is formed, for example, by laminating sand. The sand is a base material of the molded object, and is, for example, silica sand or artificial sand. The green body may be obtained by applying a binder to the sand and bonding the sand. The binder is, for example, phenol resin or water glass. The additive manufacturing system 1 is applied to all kinds of schemes, for example, by forming the green body in layers and then collectively curing the layers by sintering.

The additive manufacturing apparatus 20 shown in FIG. 1 forms the green body layer by layer in the container 10 while causing a base part 13 of the container 10 to descend. The additive manufacturing apparatus 20 forms the green body based on, for example, three-dimensional CAD data. The three-dimensional CAD data includes data of a cross-sectional shape of each layer. The additive manufacturing apparatus 20 forms a cross section of the green body layer by layer based on the data of the cross-sectional shape. The additive manufacturing apparatus 20 forms a layer using sand and a binder and forms the green body. The additive manufacturing apparatus 20 is provided with a sand supply section 21, a binder supply section 22, a guide rail 23, a drive section 24 and a controller 26.

The sand supply section 21 is provided above and away from the base part 13 of the container 10. The sand supply section 21 supplies sand onto the base part 13 of the container 10. The sand supply section 21 supplies the sand while moving, for example, in the horizontal direction (Y direction). The sand supply section 21 includes, for example, a head to supply sand and a scraper to flatten the sand supplied from the head. When the sand supplied from the head of the sand supply section 21 is flattened by the scraper, one layer of sand is supplied onto the base part 13 of the container 10.

The binder supply section 22 is provided above and away from the base part 13 of the container 10 and supplies a binder to the one layer of sand supplied from the sand supply section 21. The binder supply section 22 supplies the binder to the sand in such a way as to reproduce the cross-sectional shape based on three-dimensional CAD data and combines the sand. The amount of binder supplied is set as appropriate according to the material and the amount of sand or the like.

The guide rail 23 is provided above and away from the base part 13 of the container 10 and supports the binder supply section 22. The guide rail 23 causes the binder supply section 22 to move on a horizontal surface parallel to the base part 13 of the container 10 (planes in the X-axis direction and the Y-axis direction). While moving along the guide rail 23, the binder supply section 22 supplies the binder at a predetermined position and forms a cross section of the green body layer by layer.

The drive section 24 causes the base part 13 of the container 10 to move up and down (ascend and descend). The drive section 24 causes the base part 13 of the container 10 to descend, for example, in units of one-layer thickness. The drive section 24 has a rod 24a and a drive source (not shown) causing the rod 24a to extend/contract. A top end of the rod 24a is connected to a bottom end of the base part 13 of the container 10 and supports the base part 13. An example of the drive section 24 is an electric cylinder. The container 10 is supported in such a way that the rod 24a of the drive section 24 is connectable from below the container 10 to the base part 13 of the container 10. For example, the container 10 is placed on a base in which an opening is formed. The rod 24a of the drive section 24 is connected to the base part 13 of the container 10 via the opening of the base.

A space capable of housing the container 10 is defined in the microwave oven 30 and the microwave oven 30 obtains a molded object by irradiating the container 10 with a microwave. The microwave oven 30 has an openable/closable carrying in/out port on one side thereof and houses the container 10 via the carrying in/out port. The additive manufacturing system 1 may include a carrying apparatus (not shown) capable of carrying the container 10 from the additive manufacturing apparatus 20 to the microwave oven 30. The carrying apparatus may include rails laid from the additive manufacturing apparatus 20 to the microwave oven 30 and a carriage movable on the rails to carry the container 10.

The microwave oven 30 irradiates the container 10 with a microwave in a closed inner space. The microwave radiated from the microwave oven 30 is radiated onto the green body via the container 10. The green body is thereby heated and cured, and so the molded object is thereby obtained in the container 10. The irradiation time and irradiation intensity of the microwave are set as appropriate depending on the size of the container 10, the amount of sand or the amount of green body in the container 10 or the like.

The controller 26 is hardware controlling the whole additive manufacturing system 1. The controller 26 is constructed of a general-purpose computer including, for example, an operation apparatus such as a CPU (Central Processing Unit), a storage apparatus such as ROM (Read Only Memory), RAM (Random Access Memory), HDD (Hard Disk Drive) and a communication apparatus.

The controller 26 is communicably connected to the sand supply section 21, the binder supply section 22, the guide rail 23 and the drive section 24. The controller 26 outputs control signals to the sand supply section 21, the binder supply section 22, the guide rail 23 and the drive section 24 to control their operations. The controller 26 is connected to an operation panel (not shown) such as a touch panel to cause the sand supply section 21, the binder supply section 22, the guide rail 23 and the drive section 24 to operate in accordance with command operations by the operator received through the operation panel.

The controller 26 can also operate the sand supply section 21, the binder supply section 22, the guide rail 23 and the drive section 24 based on three-dimensional CAD data stored in the storage apparatus. The controller 26 may control the microwave oven 30. The controller 26 may also control the carrying apparatus carrying the container 10. The controller 26 may be provided outside the additive manufacturing apparatus 20.

Figure 2:
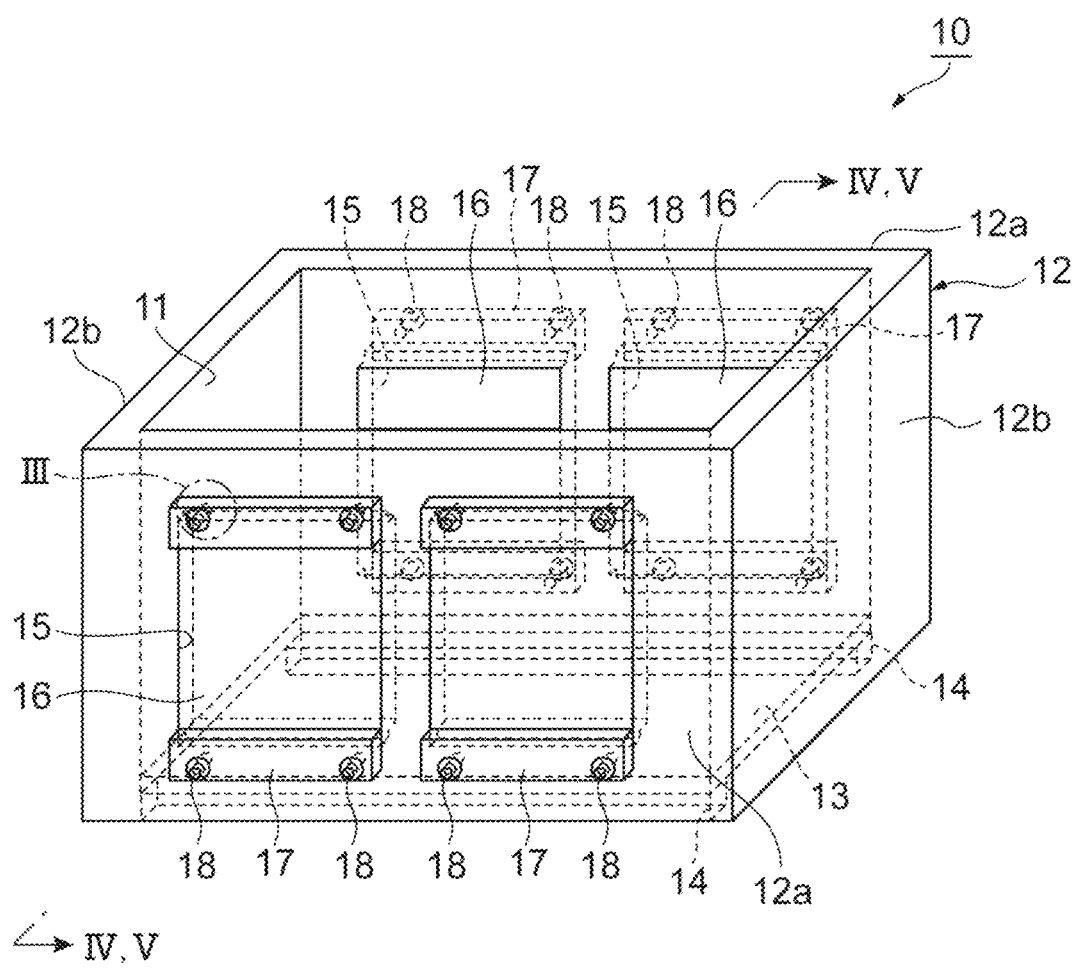
FIG. 2 is a perspective view illustrating an example of a container according to the embodiment.

FIG. 2 is a perspective view illustrating an example of the container according to the embodiment. As shown in FIG. 2, the container 10 is opened at the top thereof, and a space 11 that can be filled with sand is defined therein. The container 10 is box-shaped and includes a body section 12 and a base part 13, which is separate from the body section 12. The body section 12 is a hollow quadrangular prism, upper and lower parts of which are opened and consists of four plate-like side walls. First side walls 12a, 12a face each other in a first direction. Second side walls 12b, 12b face each other in a second direction orthogonal to the first direction.

Stoppers 14 protruding toward an inside of the body section 12 are provided at a bottom end of the body section 12. The stoppers 14 are provided on the first side walls 12a, 12a respectively. The stoppers 14 may also be provided on the second side walls 12b, 12b or may be provided on all the side walls. The provision of the stoppers 14 causes the opening at the bottom of the body section 12 to be narrower than the opening at the top.

The base part 13 is plate-shaped and has a rectangular main surface. The base part 13 is disposed inside the body section 12 in such a posture that the main surface is in a horizontal position. The main surface of the base part 13 is smaller than the opening at the top of the body section 12 and larger than the opening at the bottom of the body section 12. The base part 13 is housed in the body section 12 via the opening at the top of the body section 12 and placed on the stoppers 14. The base part 13 is supported by the stoppers 14 inside the body section 12, and the space 11 is thereby defined in the container 10.

As described above, the top end of the rod 24a of the drive section 24 is connected to the bottom end of the base part 13. As the rod 24a moves upward, the weight of the base part 13 is delivered from the stoppers 14 to the rod 24a. Thus, the base part 13 ascends while keeping the horizontal posture. As the rod 24a moves downward, the base part 13 descends and is placed on the stoppers 14. In this way, the base part 13 is disposed in such a way as to be ascendable/descendable inside the body section 12.

Part of the container 10 is made of a dielectric. An example of the dielectric is ceramic, quartz glass or fluororesin. The rest of the container 10 is made of a higher-strength material than that of the dielectric such as metal. An example of the metal is stainless steel. The "part of container 10" is, for example, part of the first side walls 12a, 12a of the body section 12. A plurality of openings 15 providing communication between an outside and an inside of the container 10 are formed in the first side walls 12a, 12a. An example of the opening 15 is a rectangular opening. The number and size of the openings 15 can be set arbitrarily.

A dielectric member 16 made of a dielectric is provided in each opening 15. The dielectric member 16 is plate-shaped and has a main surface of substantially the same size and shape as the opening 15. The dielectric member 16 is fitted into the opening 15 in such a way as to close the opening 15 and fixed to the container 10 using a support member 17 and the fixing member 18. In consideration of a thermal expansion difference from the first side wall 12a of the container 10 during heating, the size of the dielectric member 16 may be set such that a gap is provided between the side part thereof and an inner surface of the opening 15.

Figure 3:
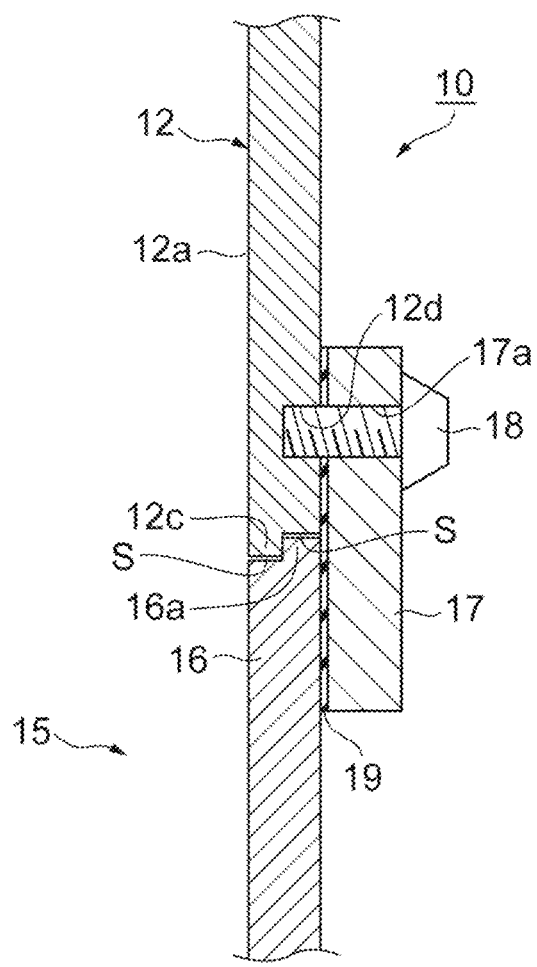
FIG. 3 is a cross-sectional view on a boundary between a side wall and a dielectric member of the container according to the embodiment.

FIG. 3 is a cross-sectional view on a boundary between a side wall and a dielectric member of the container according to the embodiment. As shown in FIG. 3, the opening 15 is narrower inside than outside the container 10. As a specific example, the first side wall 12a defining the opening 15 includes a first protrusion part 12c protruding toward the center line of the opening 15 inside the container 10. The first protrusion part 12c provides a step in the inner surface of the opening 15. A side part of the dielectric member 16 is processed so that it is fitted into the step of the opening 15. As a specific example, the dielectric member 16 has a second protrusion part 16a extending along an in-plane direction of the main surface on one side thereof. The second protrusion part 16a provides a step on a side of the dielectric member 16. The dielectric member 16 is housed in the opening 15 from the outside of the container 10 and positioned by causing the step (second protrusion part 16a) on the side to abut against the step (first protrusion part 12c) of the opening 15. A gap S is formed between the side of the dielectric member 16 and the inner surface of the opening 15.

The support member 17 is provided on a boundary between the first side wall 12a of the container 10 and the dielectric member 16 and retains the second protrusion part 16a of the dielectric member 16 between the support member 17 and the first protrusion part 12c of the first side wall 12a. A first hole 17a allowing the insertion of the fixing member 18 is formed in the support member 17. The fixing member 18 is a member fixing the support member 17 to the container 10 and includes an engaging part on an outer surface thereof. A second hole 12d is formed in the first side wall 12a of the container 10 and an engaging part engaging with the fixing member 18 is formed in the inner surface of the second hole 12d.

The support member 17 is positioned such that the first hole 17a of the support member 17 is in communication with the second hole 12d of the first side wall 12a on the outer surface of the container 10. The fixing member 18 is inserted into the first hole 17a and the second hole 12d and engages with the second hole 12d and the support member 17 is thereby fixed to the container 10. Thus, the first protrusion part 12c of the first side wall 12a and the support member 17 support the dielectric member 16. An example of the fixing member 18 is a male thread and an example of the second hole 12d is a female thread. The first hole 17a may or may not include an engaging part engaging with the fixing member 18 on the inner surface. The first hole 17a may have a larger diameter than that of the second hole 12d.

The container 10 further includes a resin sheet 19. The resin sheet 19 is interposed between the dielectric member 16 and the support member 17. The resin sheet 19 is made of a material having a small frictional coefficient. The resin sheet 19 is made of; for example, fluororesin. The resin sheet 19 reduces friction between the dielectric member 16 and the support member 17 generated by a thermal expansion difference between the dielectric member 16 and the support member 17.

Figure 4A:
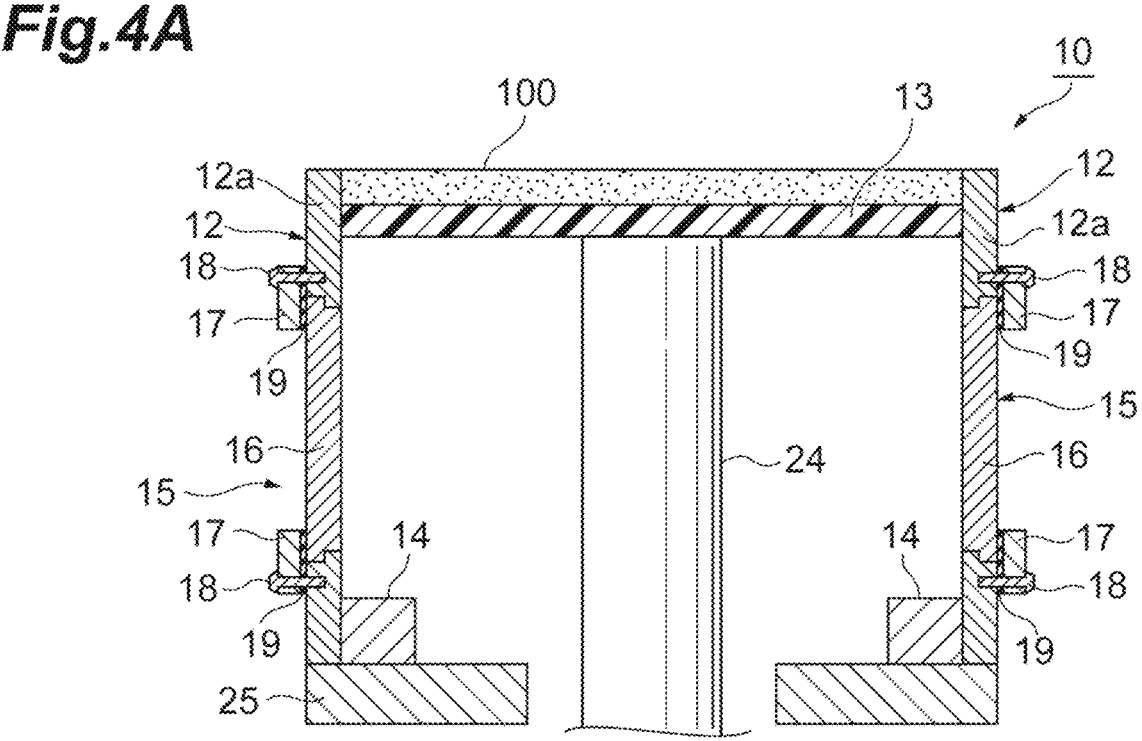
FIGS. 4A and 4B are a cross-sectional view illustrating a formation process of a green body by the additive manufacturing system according to the embodiment.

Next, a step of manufacturing a molded object using the additive manufacturing system 1 will be described. FIGS. 4A, 4B, 5A and 5B are cross-sectional views illustrating a formation process of a green body by the additive manufacturing system according to the embodiment. FIG. 4A illustrates a state in which the base part 13 of the container 10 is connected to the drive section 24 and one layer of sand 100 is supplied from the sand supply section 21 to the base part 13. As shown in FIG. 4A, the controller 26 causes the container 10 to be placed on a base 25 as a placement process. As an example, the carrying apparatus (not shown) places the container 10 on the base 25 based on the control of the controller 26. Next, the controller 26 causes the base part 13 to be connected to the top end of the rod 24a of the drive section 24 as a connection process. As an example, the drive section 24 causes the top end of the rod 24a to come into contact with the bottom end of the base part 13 based on the control of the controller 26.

Next, the controller 26 causes the drive section 24 to adjust the height of the base part 13 as a placement process. The drive section 24 adjusts the height of the base part 13 so that the top surface of the base part 13 comes to the position of the layer formation height. The "position of the layer formation height" is a predetermined height, for example, the height of the top end of the body section 12. Since the base 25 supports the bottom end of the body section 12 and the bottom ends of the stoppers 14, the drive section 24 can adjust only the height of the base part 13.

Next, the controller 26 causes the sand supply section 21 to supply one layer of the sand 100 to the base part 13 as a sand supply process. In the sand supply process, the sand supply section 21 supplies the sand 100 from the head and flattens the sand using a scraper while moving in the horizontal direction (Y direction) based on the control of the controller 26.

Figure 4B:
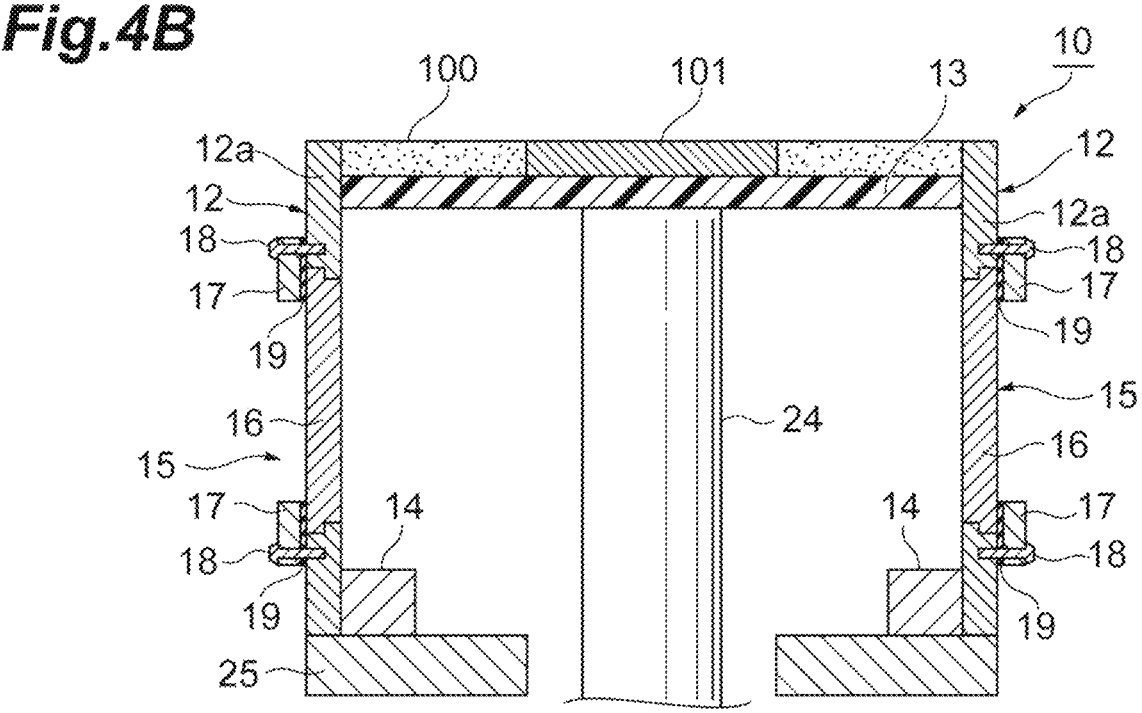

Next, the controller 26 causes the binder supply section 22 to supply a binder to the sand 100 on the base part 13 as a binder supply process. FIG. 4B illustrates a state in which the binder supply section 22 has supplied the binder to the sand on the base part 13. As shown in FIG. 4B, the controller 26 causes the binder supply section 22 to supply the binder at a predetermined position to reproduce the cross-sectional shape based on three-dimensional CAD data. The controller 26 causes the binder supply section 22 to move along the guide rail 23 and supply the binder at a predetermined position. A layer 101 of the green body is thereby formed.

Figure 5A:
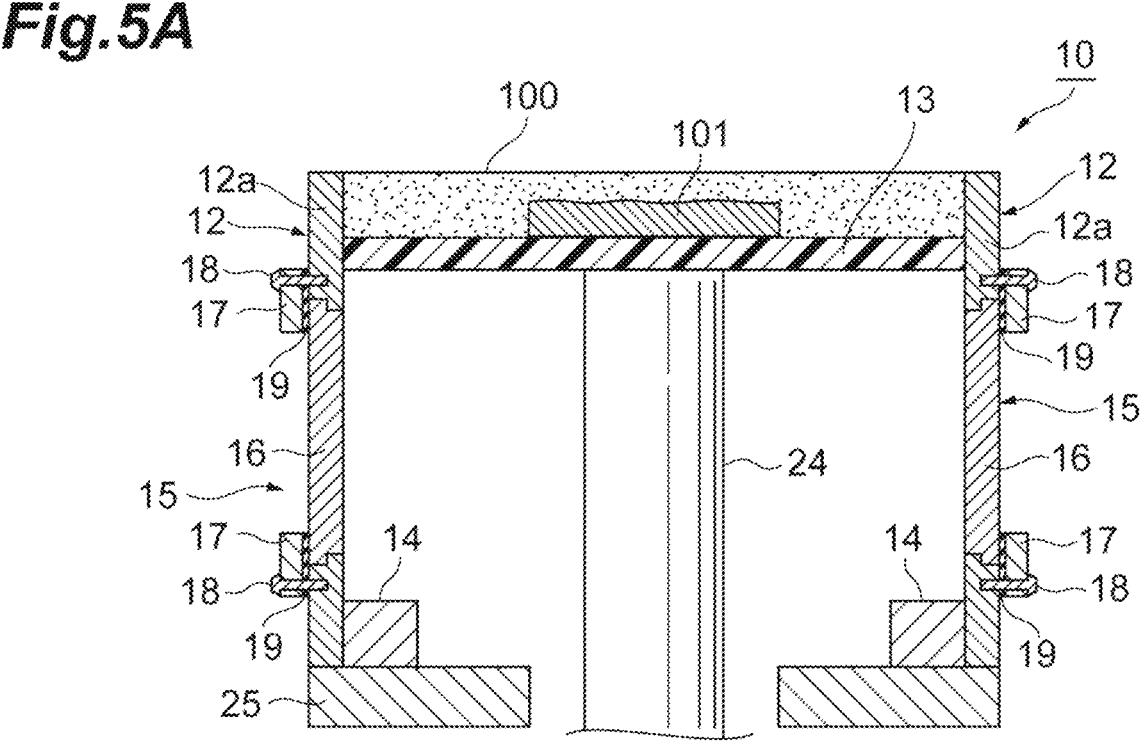
FIGS. 5A and 5B are a cross-sectional view illustrating a formation process of a green body by the additive manufacturing system according to the embodiment.

Next, the controller 26 causes the drive section 24 to adjust the height of the base part 13 as a descending process. FIG. 5A illustrates a state in which the base part 13 descends from the state in FIG. 4B by a one-layer height and the sand supply section 21 has supplied one layer of the sand 100 to the base part 13. As shown in FIG. 5A, the drive section 24 adjusts the height of the base part 13 so that the top surface of the layer of the sand 100 supplied to the base part 13 comes to the position of the layer formation height.

Next, as shown in FIG. 5A, the controller 26 causes the sand supply section 21 to supply one layer of the sand 100 as the sand supply process. In this way, the already formed layer 101 of the green body is buried in the sand 100. Thus, the controller 26 repeats the sand supply process, the binder supply process and the descending process, and thereby causes the layer 101 of the green body to be laminated on the base part 13 in the container 10 and fills the container 10 with the sand 100.

Figure 5B:
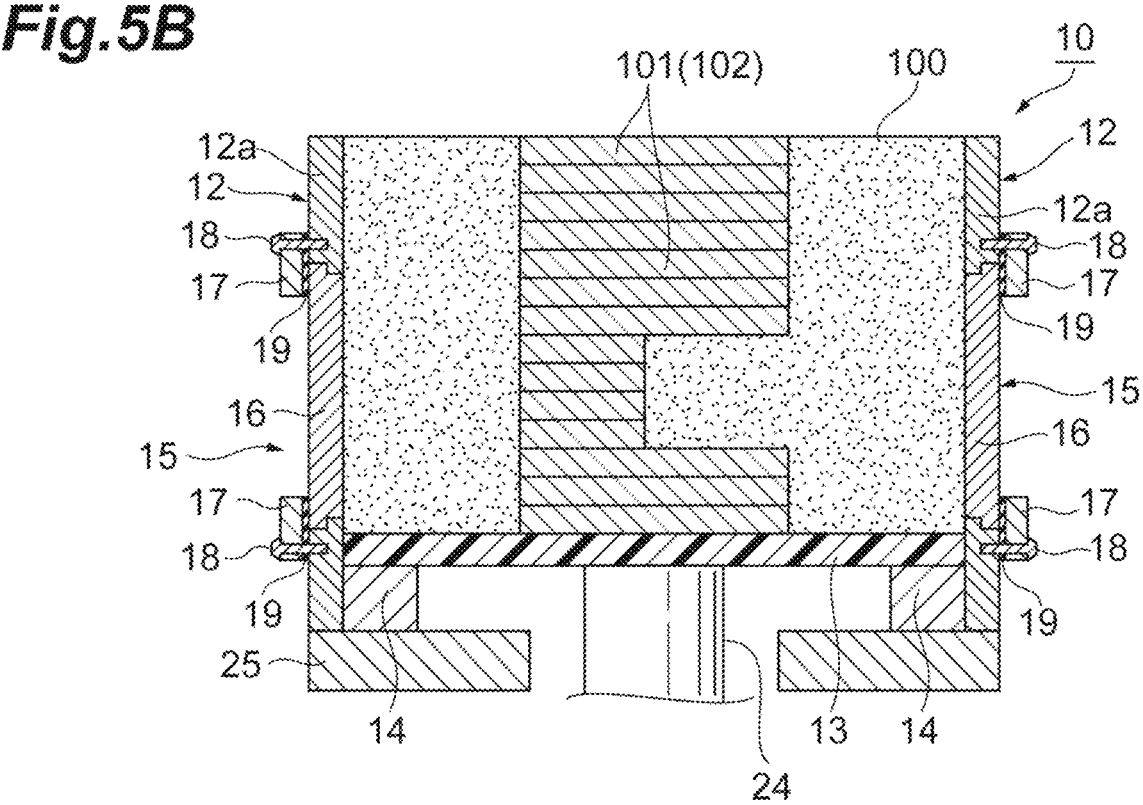

FIG. 5B illustrates an example when the sand supply process, the binder supply process and the descending process described using FIG. 4B and FIG. 5A are repeated. As shown in FIG. 5B, a green body 102 made of a plurality of the layers 101 of green body is formed. When the rod 24a of the drive section 24 moves downward, the base part 13 is placed on the stoppers 14, which restricts the base part 13 from moving below the stoppers 14. When the rod 24a of the drive section 24 further moves downward, the connection with the base part 13 is canceled. Since the dielectric member 16 is supported in a retained manner between the first side wall 12a and the support member 17, even when the container 10 is filled with the sand 100 and the green body 102, the dielectric member 16 is prevented from separating from the opening 15.

Next, the controller 26 causes the container 10 to move from the additive manufacturing apparatus 20 to the microwave oven 30 as a movement process. The controller 26 causes the container 10 to move to the microwave oven 30 using a carrying apparatus and to be housed in the space in the microwave oven 30. Since the green body 102 is formed in the container 10, it is protected by the container 10 during transportation.

Next, the controller 26 controls the microwave oven 30 to irradiate the container 10 with a microwave as a heating process. The green body 102 is thereby heated and cured, and the molded object is obtained in the container 10. Since the container 10 has a structure in which a microwave can be easily transmitted using the dielectric member 16, the microwave can transmit into the container 10 not only through the above opening of the container 10 but also from the dielectric member 16.

Here, the gap S formed between the side part of the dielectric member 16 and the inner surface of the opening 15 can absorb a thermal expansion difference from the first side wall 12a of the container 10 during heating. This reduces an increase in pressure between the dielectric member 16 and the support member 17 generated by thermal expansion of the first side wall 12a or the dielectric member 16. It is thereby possible to prevent deformation or damage of the dielectric member 16. Furthermore, since the resin sheet 19 is interposed between the dielectric member 16 and the support member 17, friction between the dielectric member 16 and the support member 17 generated by the thermal expansion difference between the dielectric member 16 and the support member 17 is reduced. Thus, the resin sheet 19 prevents deformation or damage of the dielectric member 16.

Next, the controller 26 carries the container 10 from the inside of the irradiation space of the microwave oven 30 as a carry-out process. Next, the controller 26 extracts the molded object formed on the base part 13 from the inside of the container 10 as an extraction process. The controller 26 may collect the uncured sand 100 to which the binder has not been supplied. When the extraction process ends, the manufacturing process on the molded object by the additive manufacturing system 1 ends, and the molded object is obtained.

As described so far, the additive manufacturing system 1 and the container 10 according to the embodiment can improve the speed of manufacturing the molded object. That is, the container 10 can shorten the time until the molded object is obtained from the green body 102 compared to the container in which a microwave is allowed to transmit from only the above opening. In the container 10, since the green body 102 is heated sufficiently compared to the container in which a microwave is allowed to transmit only from the upper opening, the quality of the molded object improves. Since the dielectric member 16 is provided in the opening 15, the container 10 can improve durability by forming the body section 12 using high-strength metal compared to, for example, a dielectric while maintaining a structure that allows a microwave to be transmitted easily.

The gap S formed between the side part of the dielectric member 16 and the inner surface of the opening 15 can absorb a thermal expansion difference from the first side wall 12a of the container 10 during heating. It is thereby possible to suppress deformation or damage of the dielectric member 16. Even when the gap S is formed between the side part of the dielectric member 16 and the inner surface of the opening 15, since the second protrusion part 16a of the dielectric member 16 is supported in a retained manner between the first protrusion part 12c and the support member 17, it is possible to prevent the dielectric member 16 from separating from the opening 15.

Furthermore, since the resin sheet 19 is interposed between the dielectric member 16 and the support member 17, friction between the dielectric member 16 and the support member 17 generated by the thermal expansion difference between the dielectric member 16 and the support member 17 is reduced. The resin sheet 19 can prevent deformation or damage of the dielectric member 16.

Various exemplary embodiments have been described so far, but various omissions, substitutions and changes can be made without being limited to the aforementioned exemplary embodiments. For example, the container 10 may be constructed of a cylindrical body section 12 and a disk-shaped base part 13. The container 10 may be constructed of a hollow, polyhedron body section 12 and a polygonal base part 13.

The dielectric member 16 may be provided in part of the second side walls 12b, 12b of the body section 12. The dielectric member 16 may also be provided in the base part 13 of the container 10. In this case, the microwave oven 30 may be configured to be able to irradiate the base part 13 with a microwave. The whole container 10 may be made of a dielectric alone or the body section 12 may be made of a dielectric. In that case, the container 10 need not include the opening 15, the support member 17, the fixing member 18 or the resin sheet 19. The container 10 need not be made of metal. In this case, a material resistant to heating by the microwave oven 30 is used for the container 10. The dielectric member 16 may be made of a plurality of types of dielectrics.

Instead of being fitted into the opening 15, the dielectric member 16 may be interposed between the body section 12 and the support member 17 and may be fixed by the fixing member 18. In this case, the dielectric member 16 includes a third hole through which the fixing member 18 passes, and the resin sheet 19 is provided between the body section 12 and the dielectric member 16 and between the dielectric member 16 and the support member 17 respectively. The diameter of the third hole of the dielectric member 16 may be larger than that of the fixing member 18.

The container 10 may not include the fixing member 18. In this case, the support member 17 may be fixed to an outer surface of the container 10 using an adhesive. The placement process, the connection process, the movement process, the carry-out process, or the extraction process may be executed by the operator.

DESCRIPTION OF THE NUMERALS

1 . . . additive manufacturing system, 10 . . . container, 11 . . . space, 12 . . . body section, 12a . . . first side wall, 12b . . . second side wall, 12c . . . first protrusion part, 12d . . . second hole, 13 . . . base part, 14 . . . stoppers, 15 . . . opening, 16 . . . dielectric member, 16a . . . second protrusion part, 17 . . . support member, 17a . . . first hole, 18 . . . fixing member, 19 . . . resin sheet, 20 . . . additive manufacturing apparatus, 21 . . . sand supply section, 22 . . . binder supply section, 23 . . . guide rail, 24 . . . drive section, 24a . . . rod, 25 . . . base, 26 . . . controller, 30 . . . microwave oven, 100 . . . sand, 101 . . . layer of green body, 102 . . . green body

What is claimed is:

1. An additive manufacturing system comprising:
   a container comprising
      an upper part being opened
      a base part configured to move vertically, and defining a space therein, the space being fillable with sand as a base material of a molded object and
      a plurality of side walls, each side wall comprising an opening, each opening comprising a dielectric member substantially the same size as the opening;
   an additive manufacturing apparatus configured to form a green body of the molded object layer by layer in the container while causing the base part to move down; and
   a microwave oven configured to house the container including the green body, and configured to irradiate the container with a microwave to obtain the molded object.

2. The additive manufacturing system according to claim 1, wherein the container further comprises:
   a support member supporting the dielectric member, the dielectric member being retained between the support member and the side wall;
   a fixing member fixing the support member to the container; and
   a resin sheet interposed between the dielectric member and the support member.

3. The additive manufacturing system according to claim 1, wherein the dielectric is ceramic.

4. The additive manufacturing system according to claim 2, wherein the dielectric is ceramic.

5. The additive manufacturing system according to claim 1, wherein the additive manufacturing apparatus forms the green body using the sand and a binder.

6. The additive manufacturing system according to claim 2, wherein the additive manufacturing apparatus forms the green body using the sand and a binder.

7. The additive manufacturing system according to claim 3, wherein the additive manufacturing apparatus forms the green body using the sand and a binder.

8. A container configured to be housed in a microwave oven, defining a space therein the space configured to be filled with sand as a base material of a molded object, the container comprising:

an upper part being opened;

a base part being vertically movable, a plurality of side walls, each side wall comprising an opening, each opening comprising a dielectric member substantially the same size as the opening, a support member supporting the dielectric member, the dielectric member being retained between the support member and the side wall, a fixing member fixing the support member to the container; and a resin sheet interposed between the dielectric member and the support member.

9. The container according to claim 8, wherein the dielectric is ceramic.

10. The container according to claim 8, wherein the additive manufacturing apparatus forms the green body in the space using the sand and a binder.

11. The container according to claim 9, wherein the additive manufacturing apparatus forms the green body in the space using the sand and a binder.

* * * * *